Oct. 16, 1951  D. FIRTH  2,571,699
MOUNTING FOR SHEAVES, ETC.
Filed July 11, 1946  2 SHEETS—SHEET 1
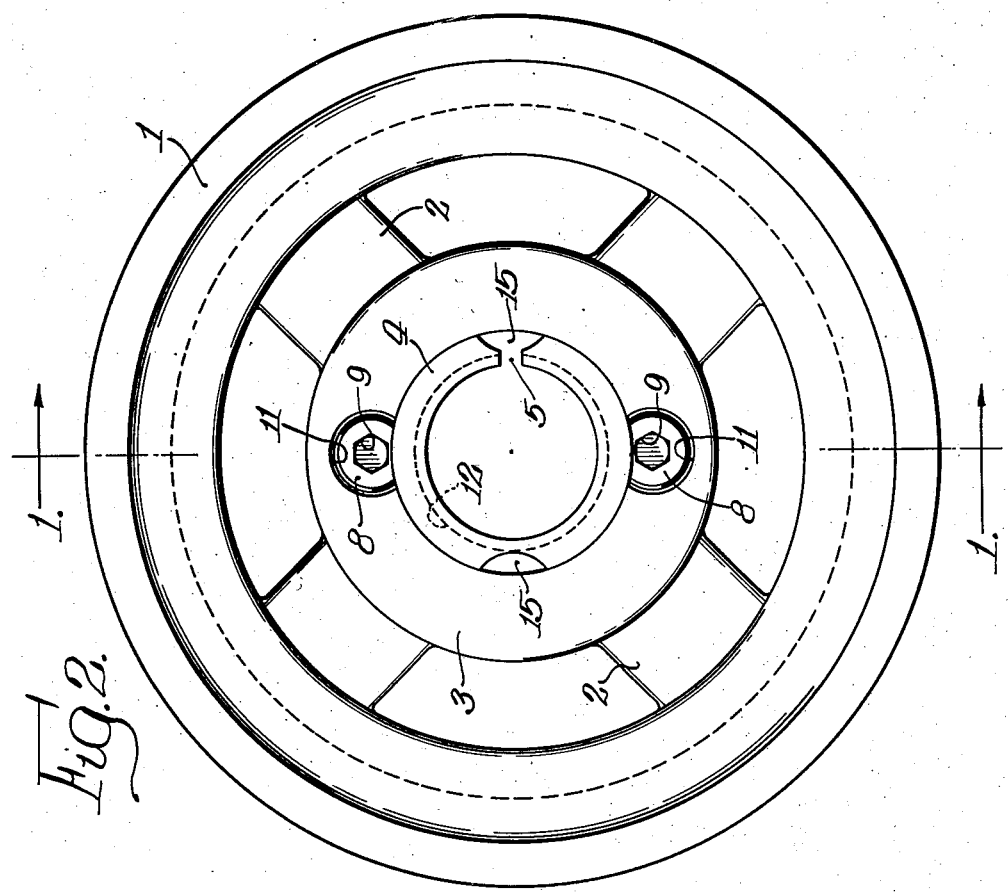
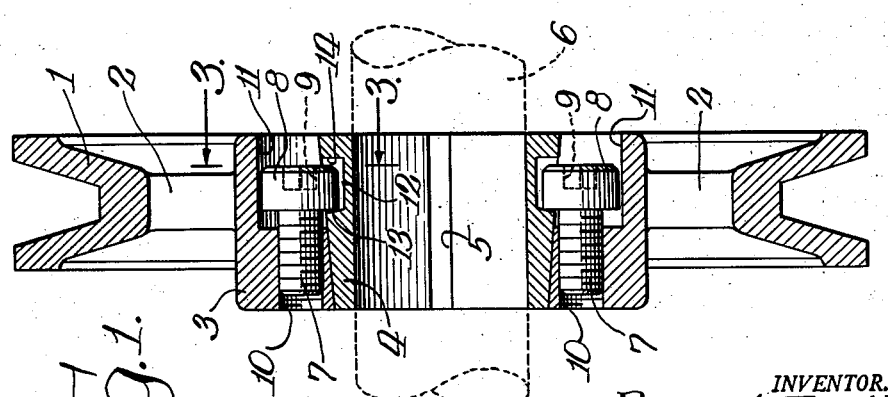
INVENTOR.
David Firth,
BY
Osgood H. Dowell
Atty.

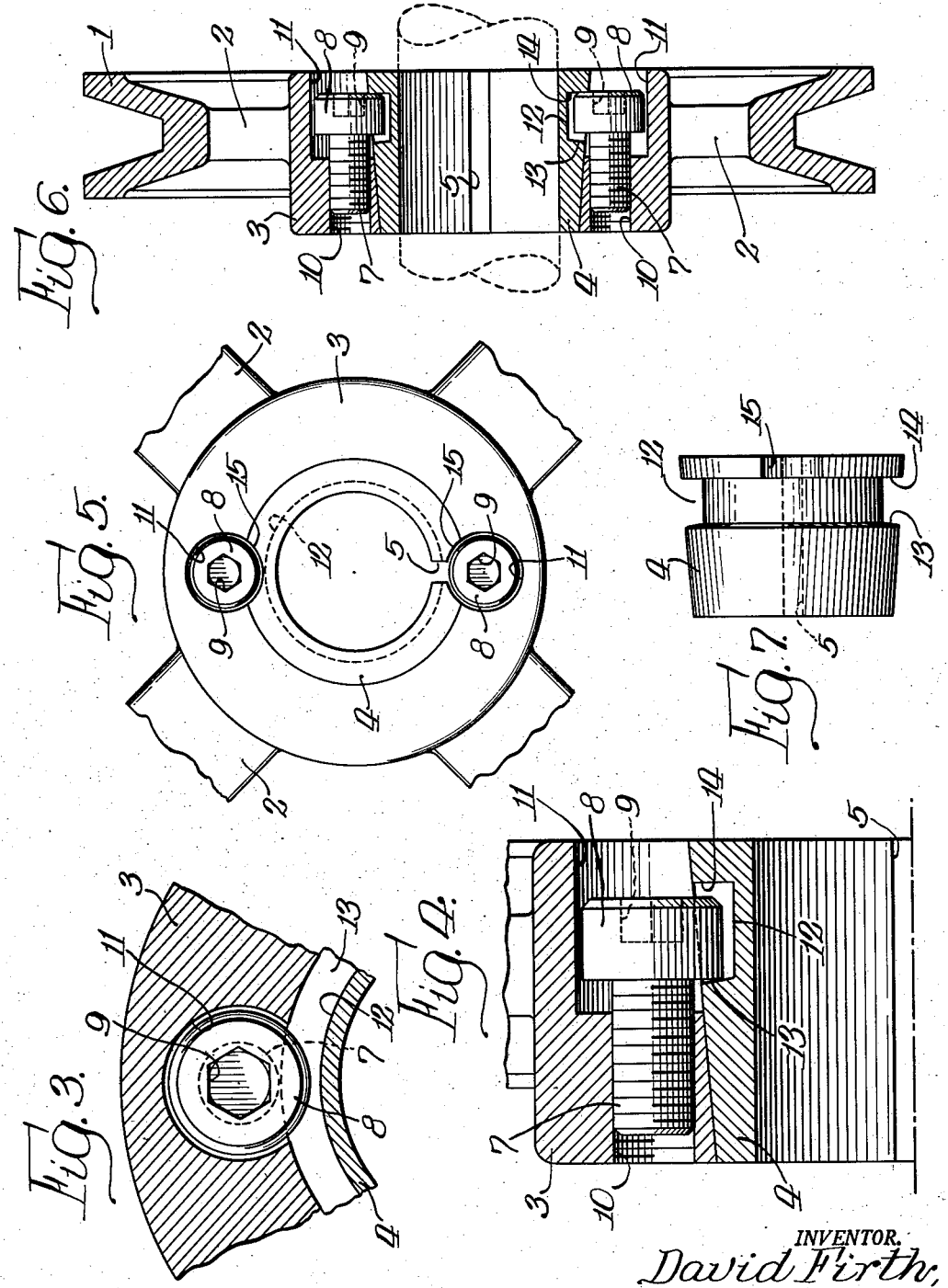

Patented Oct. 16, 1951

2,571,699

UNITED STATES PATENT OFFICE 2,571,699

MOUNTING FOR SHEAVES, ETC.

David Firth, South Bend, Ind., assignor to Dodge Manufacturing Corporation, Mishawaka, Ind., a corporation of Indiana Application July 11, 1946, Serial No. 682,831

1 Claim. (Cl. 287—52.06)

This invention pertains to hub mountings for sheaves, pulleys, sprockets and the like.

For mounting a sheave or other machine element fast on a shaft in a manner to permit easy installation and quick demounting thereof, the invention utilizes a tapered split contractible bushing fitting in the hub of such element and so operatively connected therewith by screws within the hub so as to obtain desirable simplicity and compactness of construction with capability of wedging the bushing between the hub and shaft and dewedging it by protractive and retractive operation of the screws. Further specific features and advantages of the invention will be apparent from the following description with reference to the accompanying drawings, wherein there is shown for illustration one practicable structure embodying the invention.

In said drawings:

Fig. 1 is a longitudinal section of the illustrative structure taken on the line 1—1 of Fig. 2.

Fig. 2 is a front end elevation of said structure.

Fig. 3 is an enlarged partial cross section taken on the line 3—3 of Fig. 1.

Fig. 4 is an enlarged partial longitudinal section.

Fig. 5 is a front end view of the hub portion of the structure, showing the bushing so positioned as to permit insertion or removal of the screws.

Fig. 6 is a longitudinal section of the illustrative structure with the parts in the relationship in which the bushing is about to be dewedged by operation of the screws in the direction for retracting them.

Fig. 7 is a side elevation of the bushing.

Referring to the drawings, the structure selected for illustration comprises a V-belt sheave, shown having its rim portion 1 carried by spokes 2 radiating from the sheave hub 3.

Fitting in the taper-bored hub 3 is a tapered bushing 4 split longitudinally as indicated at 5 and contractible on the shaft to which the sheave is to be applied, such shaft being indicated in dotted lines and designated by the numeral 6 in Figs. 1 and 6. The bushing is preferably bored for a fairly close or moderately free slip fit on the shaft. It may be enclosed for substantially its entire length by the hub. Preferably it is so proportioned that when tightly wedged between the hub and shaft its large end is substantially or approximately flush with the corresponding end of the hub.

Contained in the hub in threaded engagement therewith are longitudinally disposed cap screws 7 having preferably cylindrical heads 8 formed with wrench sockets 9, said screws being arranged for insertion and operation from the hub end of largest inside diameter. The screws are screwed into threaded holes 10 in the hub and their heads fit loosely in hub recesses 11 open at said end and at the interior surface of the hub, said recesses being formed by counterboring the screwholes which are so centered that the walls of the counterbored portions thereof are cut for their full lengths by the hub bore, so that the walls of said recesses are parti-circular in cross section as shown in Fig. 3.

The bushing 4 has in spaced relation from its large end an exterior annular groove 12 opening into the hub recesses 11, said groove being of such form and dimensions and in such relation to the screws that their heads 8 extend into said groove and are coactive with its opposite side walls for transmitting thrust of the screws in either direction to the bushing. It will be understood that the groove side walls 13 and 14 provide thrust-sustaining shoulders, that at the large end of the bushing appearing as a flange fitting the tapered hub bore and substantially or nearly entirely within the hub. The hub recesses 11 formed by the counterbored outer portions of the screw holes are of substantially greater length than the distance from the front end of the hub to the plane of the inner side wall 13 of the groove, so that the latter is offset forwardly or outwardly relative to the rear walls or bottoms of said recesses to permit tightening the screws against 13. As is apparent from Fig. 2, the wrench sockets 9 in the cap screw heads can be reached through the hub recesses 11 and engaged by a suitable tool or wrench for operating the screws.

By screwing up and tightening the screws against the inner side wall 13 of the annular groove 12, the bushing 4 can be tightly wedged between the sheave hub and shaft, thereby securing the sheave fast to and erect on the shaft by a press fit of the interfitted concentric parts, and establishing a dependable driving connection by the gripping engagement of the bushing with the hub and shaft. By reversely operating and tightening the screws against the outer side wall 14 of said groove, the bushing can be dewedged or released from gripping engagement with the hub and shaft, to permit removal of the sheave from the shaft.

The groove 12 is desirably of substantially greater width than the longitudinal thickness of the cap screw heads 8, not only to obtain a sloppy fit of the screw heads in said groove for reasons hereinafter indicated, but also to permit the screws, after the wedging operation, to be easily loosened in the hub, without the great resistance to unscrewing action that would be imposed if the screws were immovable axially relative to the tightly wedged bushing, and to enable them the more effectively to be utilized for the dewedging operation. Before the dewedging operation begins, a certain clearance must be taken up between the screw heads and the outer side wall 14 of the bushing groove, thus insuring a sufficient unscrewing action to loosen the screws and free the bushing from their holding effect before tightening the screws against said side wall 14. Fig. 1 may be assumed to represent the illustrative structure when the bushing is wedged between the hub and shaft. For dewedging, the screws must be unscrewed sufficiently to bring them to the position shown in Fig. 6, whereupon further operation of the screws in the direction for unscrewing them will force the bushing loose.

The assembled structure comprising the sheave equipped with the mounting means described can be easily installed by slipping it over the end of and along the shaft to desired position thereon and fastening it thereto by tightening the screws, and likewise can be easily and quickly demounted by operating the screws retractively sufficiently to loosen the bushing and then slipping the released structure off from the shaft.

For convenience in assembling the structure, the flange formed by the part of the bushing between its large end and the groove 12 may be formed with notches 15 which when in registration with the hub recesses 11 cooperate therewith to provide through passages for the cap screw heads 8, thereby permitting assembling of the structure by fitting the bushing loosely in the hub in the angular relation thereto shown in Fig. 5, then inserting the screws and screwing them up to bring their heads within the groove 12 but not tightly against the shoulder 13, and then turning the loose bushing to the position shown in Fig. 1 or other position in which the notches 15 are away from said recesses 11. Thus the notches 15 permit insertion or withdrawal of the screws while the bushing is fitted in the hub.

The provision of the notches 15 is especially desirable in an embodiment of the invention employing screws substantially longer than those shown, in order to permit easy and quick assembly; however, even if the notches 15 were not provided, it would be possible to assemble the structure, though more tediously, by holding the screws in assembly with the bushing, the latter being held approximately in alignment with the hub bore, and engaging the end portions of the screws in the screw holes 10, and then screwing up the screws a little at a time in alternation until the bushing in uncontracted state is brought to position for a loose fit in the hub.

The illustrative structure utilizing short screws and having large clearances between the cap screw heads 8 and the sides and bottom of the bushing groove 12, permitting the bushing to be canted relative to the screws while the bushing is loose in the hub, can be assembled easily and quickly by the method of inserting the bushing in assembly with the screws part way into the hub, engaging the ends of the screws in the threaded holes 10, and then repeatedly screwing up the screws in alternation, requiring in this instance only about two applications of the wrench to each screw.

A construction of the character disclosed, utilizing cap screws arranged as shown and having their heads within the hub and operatively connected with the tapered bushing therein by extending thereinto between longitudinally spaced thrust-sustaining shoulders thereof, gives desirable simplicity and compactness with capability of dewedging the bushing by reverse operation of the screws, permits the use of short screws, and is susceptible of embodiment in an easily assembled structure practicable for many uses and advantageous for economical manufacture.

Further advantages are gained by the illustrative structure, in which the cap screw heads extend into an annular groove in the bushing, permitting rotation of the bushing while loose in the hub. This allows insertion of the screws while the bushing is fitted in the hub, if the notches 15 are provided, and consequent easy and quick assemblage of such a structure of a size requiring and employing long screws. Further it avoids the necessity of fitting the bushing in the hub in any particular angular relation thereto, so that, for example, if the shoulder 14 should be gouged by the screw heads in a dewedging operation, the bushing can be adjusted in the hub to present unmarred surfaces of the groove side walls 13 and 14 to the screw heads when the structure is again installed. Moreover an advantage of forming the thrust shoulders in the bushing by an annular groove therein, rather than by separate transverse grooves or recesses in the bushing, is that the annular groove can be formed inexpensively and at practically no additional cost if the bushing is made by a through operation of an automatic screw machine.

A structure embodying the invention may have three or more suitably angularly spaced screws instead of the two shown, if required or desirable because of the size of the structure or the severity of the duty for which it is to be used.

The Allen type cap screws utilized in the illustrative structure have heads of relatively large diameter adapted to bear directly against the thrust shoulder 13, as is desirable; however such screws having heads of relatively smaller diameter could be used with thrust-transmitting washers fitted thereon adjacent to the heads, such washers being of greater diameter than the heads and fitting loosely in the hub recesses 11 and extending with the heads into the bushing groove 12, in which case the cap screw heads would abut the thrust shoulder 13 indirectly through said thrust-transmitting washers.

Where, as is preferred, cap screws are employed having heads bearing directly against the groove side wall 13, a slight beveling of said side wall, somewhat exaggerated in the drawings, is desirable to promote effective seating of the cap screw heads against said side wall, since the tensioning of the screws thereagainst tends to bend them with resultant slight canting of the screw heads.

Obviously the invention is not limited to the particular embodiment shown. It will be understood that the invention may be applied to machine elements other than sheaves to be releasably mounted on shafts.

As in other patent specifications in the art to which this invention relates, the term "shaft-mountable unit" is adapted herein to denote a sheave or other machine element having means for the mounting thereof on the shaft to which it is to be applied. In the claim the term "hub" may denote the hub of a machine element or device to be mounted on a shaft or such element as a whole having a tapered hub bore.

I claim:

A shaft-mountable unit comprising a taper-bored hub, a tapered split contractible bushing fitting therein, cap screws substantially parallel with the hub axis threaded in the hub and having their heads within the hub, said screws being inserted from the hub end of largest inside diameter and being so centered that their heads extend into the hub bore, said hub having threaded holes for said screws with counterbored outer portions in which the heads of said screws are partially contained, the walls of which counterbored portions are cut for their full lengths by the hub bore so that they are parti-circular in cross section, said bushing having in spaced relation from its larger end an annular groove into which said screw heads extend and whose side walls form thrust-sustaining shoulders, said counterbored portions of the screw holes being of greater length than the distance from said hub end to the inner side wall of said groove when the bushing is closely fitted in the hub, and said screws having means accessible to and engageable by a wrench for operating them, whereby the bushing can be wedged between the hub and a shaft by tightening said screws against the inner side wall of said groove and can be dewedged by reversely operating and tightening said screws against the outer side wall of said groove, the relation of the screw holes to the hub bore being such that under all conditions a substantial clearance exists between the outer ends of the screw shanks and the perimeter of the bushing which when loose in the hub can be rotated therein, the portion of the bushing between its larger end and said groove having notches which by rotation of the bushing can be registered with said counterbored portions of the screw holes to provide through passages for the screw heads so as to permit insertion or withdrawal of the screws while the bushing is fitted in the hub.

DAVID FIRTH.

REFERENCES CITED

The following references are of record in the file of this patent:

UNITED STATES PATENTS

| Number | Name | Date |
| --- | --- | --- |
| 2,381,697 | Shepard | Aug. 7, 1945 |
| 2,396,414 | Firth | Mar. 12, 1946 |
| 2,407,032 | Myers | Sept. 3, 1946 |
| 2,441,467 | Browning | May 11, 1948 |